United States Patent [19]

Langé et al.

[11] Patent Number: 4,900,272

[45] Date of Patent: Feb. 13, 1990

[54] CONTACT FRAME FOR AN IC CARD READER

[75] Inventors: Francois Langé, Pontarlier; Michel Pernet, Doubs, both of France

[73] Assignee: Societe Anonyme dite: ALCATEL CIT, Paris, France

[21] Appl. No.: 270,925

[22] Filed: Nov. 14, 1988

[30] Foreign Application Priority Data

Nov. 13, 1987 [FR] France .............................. 87 15739

[51] Int. Cl.⁴ ............................................ H01R 23/70
[52] U.S. Cl. ................................. 439/630; 439/736; 439/73
[58] Field of Search ............... 439/736, 629-637, 439/55, 59-62, 68-73

[56] References Cited

U.S. PATENT DOCUMENTS

| 4,501,465 | 2/1985 | Hoshino et al. | 439/736 |
| 4,747,790 | 5/1988 | Masuda et al. | 439/631 |

FOREIGN PATENT DOCUMENTS

| 0131410 | 1/1985 | European Pat. Off. . |
| 0231409 | 8/1987 | European Pat. Off. . |
| 2578072 | 8/1986 | France . |
| 8529580 | 9/1986 | Netherlands . |
| 2124420 | 2/1984 | United Kingdom . |

OTHER PUBLICATIONS

Patent Abstract of Japan, vol. 10, No. 22, (P-424) [20797], 28 Jan. 1986; and JP-A-60.173 789 (Nippon Denshin Denwakosha) 07-09-1985.

Primary Examiner—David Pirlot
Attorney, Agent, or Firm—Sughrue, Mion, Zinn, Macpeak & Seas

[57] ABSTRACT

A contact frame for an IC card reader including, in particular, guide means for guiding or positioning the card, together with contact elements for providing electrical connection with conducting pads on the IC card via which circuits are established to the apparatus including the IC card reader, the contact frame being characterized by the fact that it comprises an inner frame (7) of insulating material molded over the contact elements (4) for providing electrical connection to the IC card, and two extensions (17, 18) extending the substance of the inner frame (7) sideways towards the side edges of the card and beyond said edges, each of said two extensions carrying means (6, 19, 20) for defining the positions of two card-guiding slideways (21, 22).

11 Claims, 3 Drawing Sheets

CONTACT FRAME FOR AN IC CARD READER

The present invention relates to IC card readers. The term "IC card" is used to designate any card including at least one electronic component with which electrical connections are to be established in a reader fitted to an apparatus which is operated by this type of card (e.g. a bank terminal or a pay phone).

BACKGROUND OF THE INVENTION

In general, IC card readers comprise guide means for guiding or positioning the card, optional means for verifying that a card is present in the reader, and is present in an appropriate position, and also contact elements for providing electrical connection with conducting pads on the IC card via which circuits are established to the apparatus including the IC card reader.

One such IC card reader is described in French patent No. 2 534 713. The guide means therein are surfaces associated with the structure of the reader. The presence of a card is verified by means of an end-of-stroke microswitch and the contact elements are resilient metal blades mounted in a frame of insulating material.

There are thus three independent parts, and assembly thereof is not described in detail. Unfortunately, such a structure requires the various parts to be assembled accurately, and not only is this expensive, but given the accumulated assembly tolerances on the various parts, this may also lead to it being impossible, in practice, to satisfy the requirements of the user. In addition, the actual assembly is left to the manufacturer of the apparatus, whereas such a manufacturer would find it appreciably easier to use a unit component which did not require any special precautions.

More precisely, the force exerted by each of the contact elements for connection to the IC card when pressing against a conducting pad of a card can be expressed by an equation of the type $f = kx$, where k represents the resilient characteristics of the contact element, and x represents the deflection to which said contact element is subjected in the presence of a card. This force f must be obtained relatively accurately, i.e. with relatively narrow tolerances, since if it is too small then there are problems of contact resistance, and if it is too large, then there are problems of wear both with the contact elements and with the cards. Further, the force exerted by all of the contact elements together on a card give rise to a force retaining the card in the apparatus, and this overall force is also subject to narrow tolerances. Unfortunately, the value of k may vary in the course of industrial manufacture by as much as ±25%, for example. Although this amount of tolerated variation could be reduced to a smaller value, that would require expensive measures to be undertaken. If it is desired that the force f remain within limits which are not much wider than those allowed to the factor k, then x must be defined as narrowly as possible. In other words accurately positioning the card relative to the contact elements is of capital importance.

The object of the invention is thus to provide a unit component called herein a "contact frame", said component solving the problems of assembly tolerances and making it possible to satisfy the severest card positioning requirements at reduced cost, said component being very simple to use.

SUMMARY OF THE INVENTION

The present invention includes the improvement of comprising an inner frame carrying the contact elements for connecting with the IC card, with the substance of said inner frame being extended by two extensions extending towards the side edges of the card and beyond said edges, each of said two extensions carrying means for defining the position of a corresponding one of two card-guiding slideways.

These extensions are preferably perforated. At least a portion of the slideway is formed in the substance of each extension. At least a portion thereof may be added to each extension. An add-on piece constituting a lid may extend from one slideway to the other. A brake pressing the card against the add-on piece may be incorporated either in the contact frame or else in its lid. Finally, the frame may include an end-of-stroke abutment and an end-of-stroke contact whose components are inserted in the frame.

BRIEF DESCRIPTION OF THE DRAWINGS

An embodiment of the invention is described by way of example with reference to the accompanying drawings, in which.

MORE DETAILED DESCRIPTION

Figure 1:
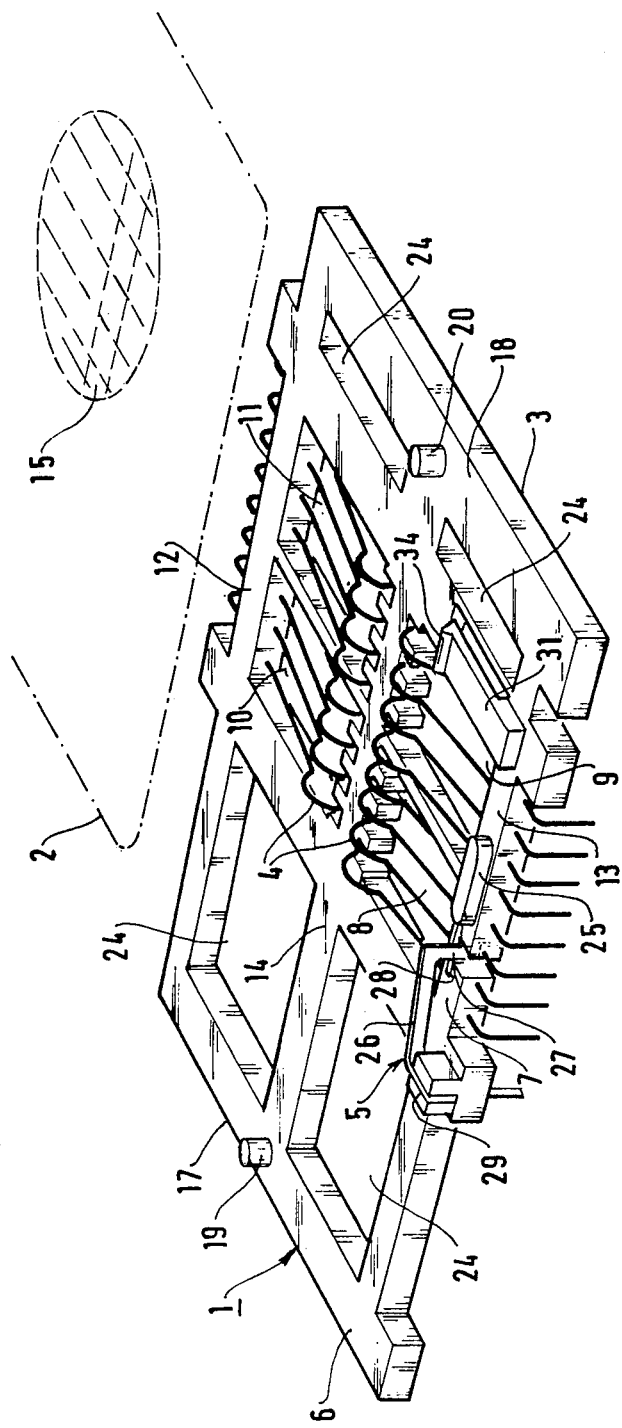
FIG. 1 is a perspective view of a contact frame in accordance with the present invention.

FIG. 1 is a perspective view of a contact frame 1 designed in accordance with the present invention and showing an IC card 2 in position to be inserted. For the purposes of this description, these two parts are shown upside down relative to the normal position thereof in which the card is presented with its contact zone on top and in which the contact frame 1 should therefore be disposed above the card and facing the card. The frame essentially comprises a part 3 made of molded insulating material and acting simultaneously: as a support for contact elements 4 used for making connections with the integrated circuit (IC) on the card 2; as a support for an end-of-stroke contact 5 for indicating that a card is present in the reader and properly positioned for the purposes of being read; and as a support at least for slideways 6 for guiding the card and intended to lead it to the above-mentioned position in which it can be read.

Figure 2:
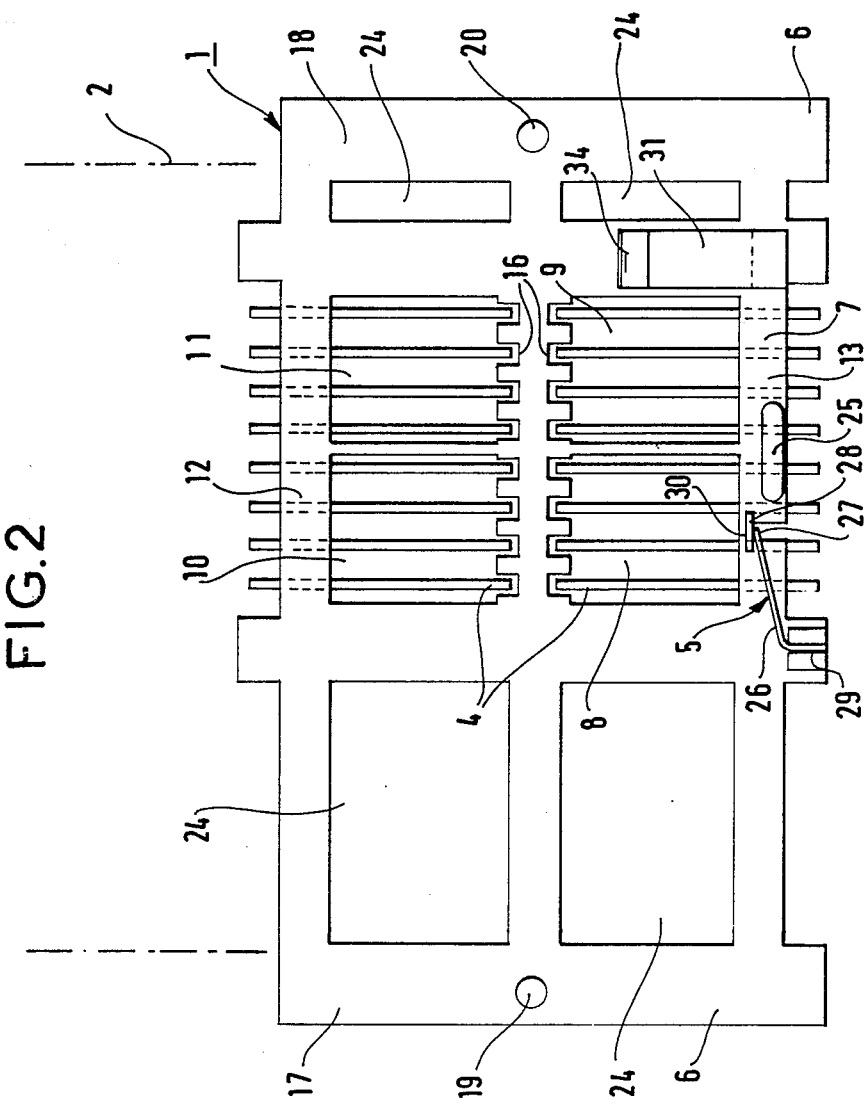
FIG. 2 is a plan view of the FIG. 1 frame.

To this end, the contact frame 1 comprises an integral inner frame portion 7 constituted by portions of the frame 1 delimiting connection windows 8, 9, 10, and 11. The contact elements 4 extend into these windows from bars 13 and 12 in which they are overmolded. It can thus be understood that the positions of the contact elements 4 are determined by the positions of a portion of the mold used for forming the frame 1. The contact elements 4 are shaped and they project above the plane 14 of the top surface of the frame 1. They are intended to come into contact with contact pads in the connection zone 15 of the card 2 when the card is properly inserted in the IC card reader. With reference to FIG. 2 which is a plan view of the FIG. 1 contact frame, it can be seen that the windows 8 to 11 include indentations 16 which protect the ends of the contact elements 4.

Figure 3:
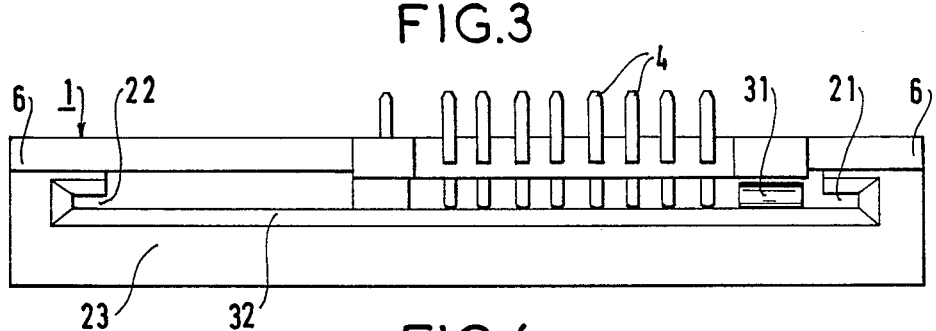
FIG. 3 is an end view of the FIG. 1 frame, with a lid constituting the card-guiding slideways.

The inner frame portion 7, as shown in FIGS. 1 and 2, is extended by two extensions 17 and 18 which terminate at their ends furthest from the inner frame portion 7 in sildeway supports 6. In a first embodiment, these supports 6 are mere flat surfaces, each provided with at least one centering peg 19 or 20. Other slideway positioning means could be provided instead of or in addition to those mentioned above. Further, the centering pegs such as those shown in FIGS. 1 and 2 may also serve as fixing means (e.g. by rivets) for the slideways. Reference is made to FIG. 3 which is an end view of the frame 1 as shown in FIGS. 1 and 2, shown the usual way up, this time. It can be seen that slideways 21 and 22 are both formed in a piece of molded insulating material constituting a lid 23 and mounted on the support 6 of the frame 1. The lid 23 is accurately positioned relative to the frame 1 by the centering pegs 19 and 20. It guides the card 2 by engaging its edges. If the same portion of the mold as that which defines the positons of the contact elements 4 also serves for defining the surfaces 6 and the centering pegs 19 and 20, then the positioning of the card 2 relative to the contact elements 4 is obtained with a degree of accuracy which is now related solely to the care with which the mold for forming the frame 1 is made and to the assembly tolerances between the frame 1 and the lid 23, which assembly is performed in the factory, i.e. with narrow tolerances.

As can be seen in FIGS. 1 and 2, the extensions 18 and 19 are perforated with relatively large holes 24 in order to save plastic.

The contact frame 1 also carries an end-of-stroke contact 5 and an end-of-stroke abutment 25. The end-of-stroke contact 5 is normally closed contact which is opened by the card shortly before it comes into abutment against the end-of-stroke abutment 25 by pressing against the end 27 of a moving blade 26, thereby separating the blade from a fixed contact 28. The two blades are force-fitted in slots 29 and 30 provided in the frame 1, thereby ensuring that they are accurately positioned. Further, the abutment 25 ensures that the card is properly positioned in the IC card reader.

Finally, FIGS. 1 and 2 show a pusher 31 which is integrally molded with the frame 1 and which comprises a resilient blade for pressing the IC card 2 against the lid 23, thereby pressing it against the face of the slideway opposite to the contact elements and thus accurately defining the distance of the card from the contact elements 4.

Figure 4:
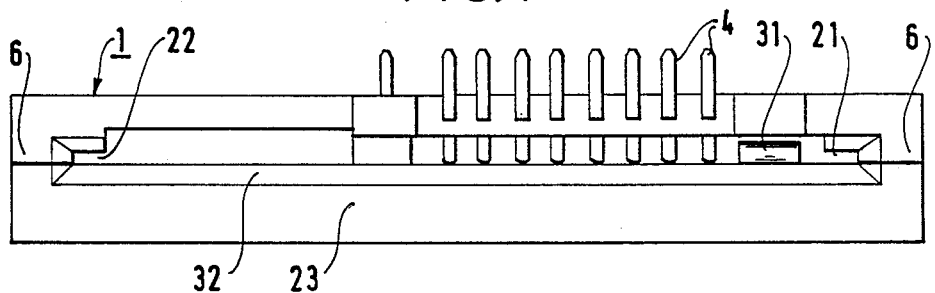
FIG. 4 is a fragmentary end view showing slideways formed in part on the frame and in part on the lid.
Figure 5:
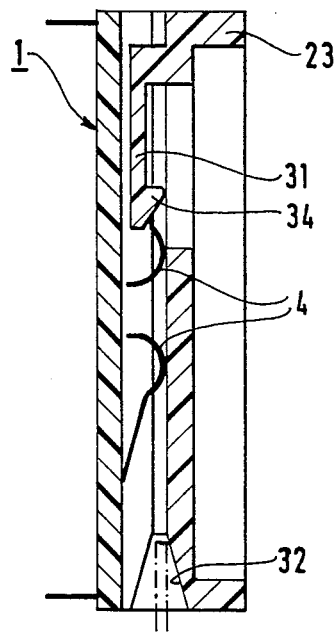
FIG. 5 is a side view of the FIG. 3 frame.

As can be seen in FIGS. 3, 4, and 5, the pusher may alternatively be integrally formed with the lid 23, extending from the end thereof which is not reached by the card, and being cantilevered back from that and towards the center of the frame 1. Its end 34 is shaped so as to be cammed away by the leading edge of the card 2, after which it exerts pressure on the card by means of a rounded surface so as to avoid damaging the card.

It may also be observed that the opening via which the IC card is inserted between the parts 1 and 23 is chamfered at 32 in conventional manner.

There remains the possibility, which can be seen by comparing FIGS. 3 and 4, that at least a portion of the slideway on either side of the frame is integrally formed with the frame 1, as shown in FIG. 4. This provides an IC card reader having all of its dimensional tolerances determined by a single molded part, thereby providing a solution which is both effective and cheap. However, the slideways may be at least partially formed in parts which are added on, or preferably in a single lid-forming add-on part, as shown in FIG. 3, for example. Insofar as this part may itself be mounted on the frame 1 during manufacture of the frame, narrow tolerances can still be ensured under economic conditions.

Naturally, the above description is given purely by way of non-limiting example and numerous variants may be envisaged without thereby going beyond the scope of the invention.

What is claimed:

1. A contact frame for contact with an IC card of an IC card reader, said IC card having opposite side edges, said contact frame comprising, in particular, guide means for guiding or positioning the IC card, together with contact elements for providing electrical connection with the conducting pads on the IC card via which circuits are established to the apparatus including the IC card reader, the improvement wherein the contact frame comprises an inner frame portion of insulating material molded over the contact elements for providing electrical connection to the IC card, said inner frame portion being a hollow structure comprising at least two side members and two beams supported between the two side members, said two beams each carrying a contact set, with said contact sets mainly extending from one beam in the direction of the other, and two extensions extending said inner frame portion sideways towards said side edges of the card and beyond said side edges, each of said two extensions carrying means for defining the portion of a corresponding one of two card-guiding slideways.

2. A contact frame according to claim 1, wherein said contact frame carries a moving contact blade and a fixed contact blade of an end-of-stroke contact disposed on the front edge of said frame which is not reached by said card, except for a portion of the moving blade against which the card comes into abutment when it reaches the end of its stroke.

3. A contact frame according to claim 1, wherein the extensions are perforated, at least in part.

4. A contact frame according to claim 1, wherein the slideways are made, at least in part, from the substance of said frame.

5. A contact frame according to claim 1, wherein each slideway is constituted, at least in part, by a piece added to each extension.

6. A contact frame according to claim 5, wherein said add-on pieces are integrally formed with a part covering said frame and constituting a lid which is assembled therewith.

7. A contact frame according to claim 5, wherein the slideways are totally constituted by an add-on lid-forming part.

8. A contact frame according to claim 1, wherein said frame carries an elongate resilient portion provided with a shaped end suitable for withdrawing in front of the leading edge of a card inserted in the reader and then for pressing the card against said lid.

9. A contact frame according to claim 8, wherein said elongate resilient portion is disposed between the connecting contact elements and the edge of the card which is closest thereto.

10. A contact frame according to claim 1, wherein said lid carries an elongate plastic portion extending rearwardly from the front edge of the lid which is not reached by the card, and provided with a shaped end which withdraws in front of the leading edge of a card inserted in the reader, and which then presses the card against said lid.

11. A contact frame according to claim 10, wherein said elongate resilient portion is disposed between the connection contact elements and the edge of the card which is closest thereto.

* * * * *

UNITED STATES PATENT AND TRADEMARK OFFICE
CERTIFICATE OF CORRECTION

PATENT NO. : 4,900,272
DATED : February 13, 1990
INVENTOR(S) : Francois Lange, et. al.

It is certified that error appears in the above-identified patent and that said Letters Patent is hereby corrected as shown below:

Column 1, lines 20-21, "French patent No. 2 534 713" should be change to -- U.S. Patent No. 4,902,233, dated February 20, 1990 --.

Column 4, line 25, "portion" should read --position -- and the words "a corresponding" should be deleted.

Signed and Sealed this

Twenty-first Day of September, 1999

Attest:

Q. TODD DICKINSON

*Attesting Officer*  Acting Commissioner of Patents and Trademarks